United States Patent
Forssell

(10) Patent No.: US 6,869,135 B2
(45) Date of Patent: Mar. 22, 2005

(54) BODY SECTION

(75) Inventor: Jonas Forssell, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,766

(22) Filed: Oct. 16, 2001

(65) Prior Publication Data

US 2003/0071489 A1 Apr. 17, 2003

(30) Foreign Application Priority Data

Oct. 16, 2000 (EP) .............................................. 00122528

(51) Int. Cl.⁷ .............................................. B60K 27/00
(52) U.S. Cl. ................................................. 296/203.03
(58) Field of Search ........................... 296/203.01, 205, 296/203.02, 203.03, 203.04, 209, 29, 30

(56) References Cited

U.S. PATENT DOCUMENTS

| | | | | |
|---|---|---|---|---|
| 1,461,907 A | * | 7/1923 | Hughes ........................ | 296/29 |
| 3,132,891 A | * | 5/1964 | Pyuro et al. ................. | 296/209 |
| 4,355,844 A | * | 10/1982 | Fantini Muzzarelli ...... | 296/205 |
| 4,493,506 A | * | 1/1985 | Alexander ................... | 296/209 |
| 5,609,004 A | * | 3/1997 | Kreis ........................... | 296/29 |
| 6,068,330 A | * | 5/2000 | Kasuga et al. ............... | 296/205 |
| 6,102,605 A | * | 8/2000 | Emmons ....................... | 296/29 |
| 6,296,300 B1 | * | 10/2001 | Sato ............................. | 296/203.02 |
| 6,334,642 B1 | * | 1/2002 | Waldeck et al. ............. | 296/29 |
| 6,357,822 B1 | * | 3/2002 | Panoz et al. ................. | 296/209 |
| 6,475,577 B1 | * | 11/2002 | Hopton et al. ............... | 296/205 |
| 6,592,174 B1 | * | 7/2003 | Rollin et al. ................ | 296/190.08 |
| 2001/0030450 A1 | * | 10/2001 | Miyasaka ..................... | 296/204 |
| 2002/0190543 A1 | * | 12/2002 | Hanyu ......................... | 296/203.03 |
| 2003/0184126 A1 | * | 10/2003 | Yamazaki et al. ........... | 296/209 |

FOREIGN PATENT DOCUMENTS

| | | | | |
|---|---|---|---|---|
| DE | 40 18592 A1 | 12/1991 | | |
| EP | 0604745 A1 | 11/1993 | | |
| EP | 0823368 A1 | 7/1996 | | |
| JP | 61-229637 | * 10/1986 | .................. | 296/93 |
| JP | 4-221276 | * 8/1992 | .................. | 296/209 |

\* cited by examiner

*Primary Examiner*—D. Glenn Dayoan
*Assistant Examiner*—Hilary L Gutman
(74) *Attorney, Agent, or Firm*—Gigette M. Bejin

(57) ABSTRACT

The present invention relates to a metal profile (1), for a vehicle body section. The profile includes side walls (10a, 10b), a base plate (8) and two support walls (2a, 2b). The walls (2a, 2b, 10a, 10b) and base plate (8) constituting a sectional area with at least three hollow sections (6a, 6b, 7). The base plate (8) and said support walls (2a, 2b) constitute an internal section (7), of said metal profile with a substantially triangular sectional area. The internal triangular section (7) having substantially three corners (9, 11, 12). The invention also relates to a body section and a vehicle that includes the metal profile.

4 Claims, 2 Drawing Sheets

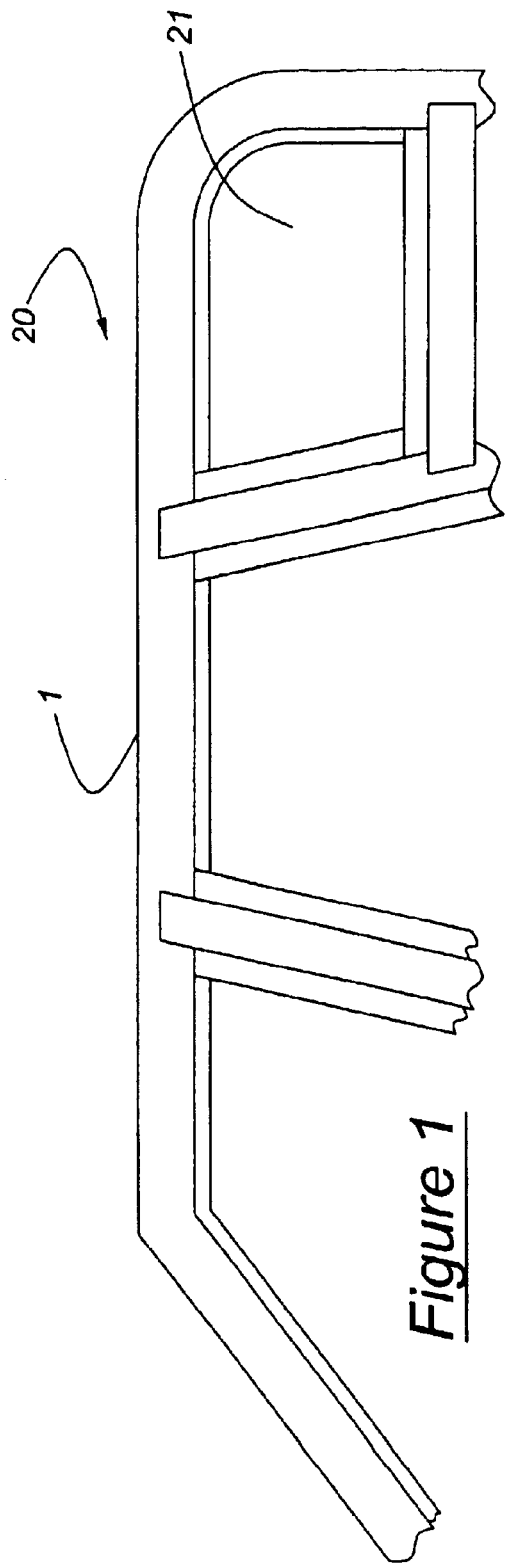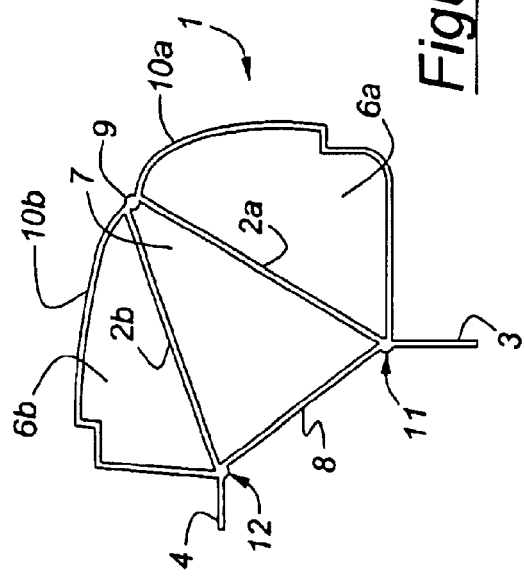

BODY SECTION

BACKGROUND OF INVENTION

The present invention relates to a metal profile for a vehicle body section.

The complicated structure which constitutes a vehicle body structure demands a lot of its components. Especially the profiles of the body structure have many different and sometimes even contradictory functions to fulfill.

The profiles should not only be inexpensive and easy to manufacture and put together but also be robust in order to provide enough safety for passengers in the vehicle. Pipes or profiles similar to pipes present an alternative solution to the above outlined problem.

However, this kind of state of the art profiles usually has two major disadvantages. The bending strength, which is important especially in case of a crash, is not as strong relative to other profiles which are more complicated and more expensive to manufacture. The other disadvantage is that the attachment of other sections becomes difficult.

Typically, existing profiles consist of quite a number of details that are mounted together in order to provide a body structure that will comply with different demands regarding specific attachments. DE 401 8592 A1 discloses a vehicle body structure illustrating a few structural elements provided with a plurality of means for attaching various members to the structure. The manufacturing of such a complicated structure has the disadvantage of being expensive, which is a problem in today's competitive car industry. Hence there is a need for providing an easier and simpler body structure which nonetheless provides excellent performance.

A further requirement related to the attachment of other sections is that the profiles will provide support and strength for the sections allowing e.g. higher stiffness on attaching members.

Adding thickness to the profile gauge could solve the other problem related to the bending strength of the profile. However, the added thickness will add weight to the structure, which might lead to an increase in fuel consumption.

SUMMARY OF INVENTION

The object of the present invention is to provide a profile that overcomes the above problems, and makes it possible to provide a high bending strength while maintaining a low gauge thickness.

A further object is to provide an accurate and strong attachment for different kinds of sections to the profile.

It is still a further object to provide a profile, which achieves these and other objects but is yet inexpensive and especially simple to manufacture and install in a vehicle.

These and other objects are achieved by a profile and a body section according to the present invention, which makes it possible to achieve a high bending stiffness with extremely low gauge thickness. Preferred embodiments of the invention are given by the depending claims.

According to the invention there is provided a metal profile, for a vehicle body section, said profile comprising side walls, a base plate and two support walls, said walls and base plate constituting a sectional area with at least three hollow sections, characterised in said base plate and said support walls constituting an internal section, of said metal profile, with a substantially triangular sectional area, said internal triangular section having substantially three corners.

This arrangement makes it possible to provide more bending stiffness to a vehicle metal profile keeping a simple and slender structure of the profile.

In an embodiment of the invention the metal profile has at least one flange. In a second embodiment of the invention the metal profile has two flanges integrated with said metal profile.

The flanges can be used for attaching various elements and also provide added stiffness and support to the profile and the attached members. Primarily the flanges are for fastening other elements.

Preferably the flanges are placed closely to at least one corner of the internal section.

This arrangement provides increased stiffness to the attachments from the metal profile.

In a preferred embodiment of the invention the flanges are placed closely to the corners of said base plate in said internal section.

The manufacturing process can typically be chosen from a variety of alternatives well known by one skilled in the art, of which the following alternatives are considered suitable. The metal profile according to an embodiment of the invention consists of an extruded profile. Alternatively the metal profile is formed from one piece of a metal sheet. Particularly the alternative of being able to form a metal profile according to the invention from one piece of metal with a suitable thickness provides a great advantage in the manufacturing process. A further advantage is that the shape of the final profile allows the profile members to be welded together easily due to the fact that the attaching members are easy to reach and work with.

The metal profile can also be hydro formed from one piece of a metal sheet.

In a preferred embodiment of the invention the metal profile is provided with stiffener means. The stiffener means will add further strength to the profile. Preferably the support walls in the triangular section are provided with stiffener means to further increase the strength of the profile.

It is also an object of the present invention to provide a body section in a vehicle comprising a metal profile characterised in said metal profile, having side walls, a base plate and two support walls, said walls, and base plate constituting a sectional area with at least three hollow sections, said base plate and said support walls constituting an internal section, of said metal profile, with a substantially triangular sectional area.

By using the profile according to the present invention in a body section of a vehicle, strength advantages in assembling the vehicle structure and other advantages listed above are provided. Especially a body section according to the invention having at least one flange will provide advantages to the assembling process and robustness to the structure and to the structure attached members.

In a preferred embodiment of the body section, said metal profile has two flanges integrated with the metal profile.

In addition to the above listed assembling advantages of the body structure according to the invention the flanges will add stiffness to the attached members and also provide means for a strong attachment of the members to said body section.

Thus, a further advantageous embodiment of the body section is provided by a second profile that is attached to the metal profile in a first attachment supported by a flange of said metal profile. It is an object for the flanges of the present invention to allow for not only fastening of various members or articles to the body section but also provide strong support to the same, especially in the attached areas. The flanges are primarily fastening flanges.

In an especially preferred embodiment of the invention, the body section, has at least one further attachment to said metal profile on a distance from the first attachment in a transverse direction relative to said metal profile and said second profile.

This arrangement provides excellent fastening to the body section of profiles or other members, elements or articles, of which elements further examples are given in the following description. The possibility to attach, e.g., a pillar to the metal profile in points on at least two levels will provide the total body section and especially the attachment with an excellent bending moment capacity.

A further advantage with the above outlined fastening of elements is that despite the fact that the attachments are located at two different levels of the body section, the increase in height, caused by putting two elements together, will only be constituted by either the thickness of a flange or the gauge thickness of any of the attached members.

According to an embodiment of the invention there is provided a body section, wherein a windshield is attached to said metal profile. The flange of said metal profile provides a sealing flange for a vehicle door.

Alternatively, a pillar is attached to a metal profile according to the invention supported by a flange of said metal profile.

BRIEF DESCRIPTION OF DRAWINGS

A currently preferred embodiment of the present invention will now be described in more detail, with reference to the accompanying drawings.

FIG. 1 is a schematic longitudinal section view of an embodiment of a body section comprising the profile according to the present invention.

FIG. 2 is a cross section of a profile of an embodiment of the present invention.

DETAILED DESCRIPTION

Figure 3:
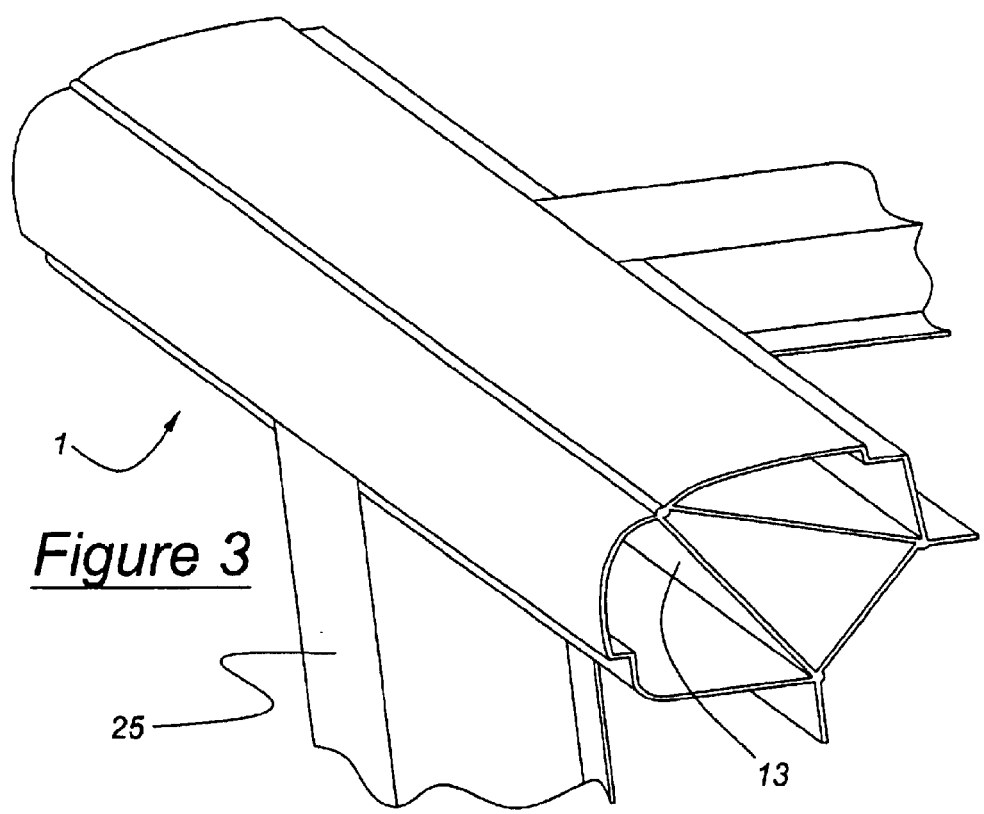
FIG. 3 is a perspective view of a part of the profile with other sections attached.

The embodiment of the invention, which will be described in the following, is related to metal profiles for a vehicle.

A preferred embodiment of the invention will be described with reference to the accompanying drawings where most of the benefits of the characteristic features are described.

Referring now to FIG. 1, in which a body section 20 in a vehicle comprising a metal profile 1 according to a preferred embodiment of the invention 1 is shown.

FIG. 2 shows a section of a preferred embodiment of said metal profile 1, having side walls 10a, 10b, a base plate 8 and two support walls 2a, 2b. Said walls 2a, 2b, 10a, 10b and base plate 8 constitute a sectional area with at least three hollow sections 6a, 6b, 7. The base plate 8 and said support walls 2a, 2b constitute an internal section 7, of said metal profile 1, with a substantially triangular sectional area 7.

By the triangular shaped internal section the bending stiffness of the profile is doubled compared to a corresponding profile without this specific section.

The metal profile 1 of the present invention has at least one flange 3; 4. Preferably the metal profile 1 has two flanges 3, 4 integrated with said metal profile 1. The flanges 3, 4 are placed closely to at least one corner 9; 11; 12 of said internal section 7. In a preferred embodiment of the present metal profile invention the flanges 3, 4 are placed closely to the corners 11, 12 of said base plate 8 in said internal section 7.

It is not an object of this invention to present a specific method of making the metal profile, since the invention is perfect for conventional state of the art techniques considering the manufacturing of the profile.

The metal profile 1 according to a preferred method is formed from just one piece of a metal sheet. The method to be used to form the profile is familiar to a person skilled in the art and is not an object for this particular invention. However, the specific shape as illustrated by FIG. 2 makes it possible to provide such a strong but yet slender profile out of only one metal sheet. It is a further advantage that the parts and corners that need to be securely attached are conveniently reached and treated by e.g. welding even after the forming process. Spot welding is a non-restrictive example of a preferred method to provide attachment between sides, corners or flanges of the metal profile.

The metal profile can be manufactured by roll- or hydro forming starting from one piece of a metal sheet. An alternative, which is very suitable for some metals, is to use extrusion in order to provide a metal profile according to the present invention.

Referring to FIG. 3 a metal profile 1 according to the invention that is provided with stiffener means 13 is shown. Preferably at least one of said support walls 2a, 2b of said internal section are provided with stiffener means 13. The stiffness is provided by e.g. adding stiffener means such as, reinforcements for the support walls 2a, 2b, adding thickness to the supportive walls 2a, 2b or any other related means to provide stiffness. This will further increase the stiffness of the metal profile 1 of the present invention.

Figure 4:
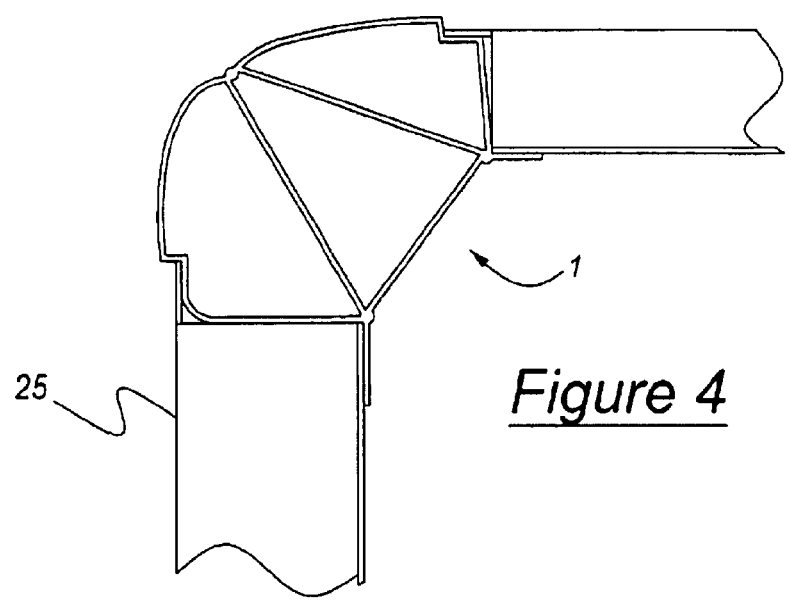
FIG. 4 is a side view of FIG. 3.

Referring now to FIG. 4 showing a section of a preferred embodiment of the body section 20 according to the invention. A second profile 25 is attached to said metal profile 1 in a first attachment supported by a flange 3 of said metal profile 1. The second profile 25 has one further attachment to said metal profile 1 on a distance from the first attachment in transversal direction relative said metal profile 1 and said second profile 25.

It is also an object of the present invention to provide a body section 20 with e.g. a windshield 21, a roof bow, a sealing flange of a rubber like material or a pillar attached to said metal profile 1 supported by a flange 3; 4.

The present invention should not be considered as being limited to the above-described preferred embodiment, but rather includes all possible variations covered by the scope defined by the appended claims.

What is claimed is:

1. A body section in a vehicle comprising:

a metal profile, wherein the metal profile includes at least two side walls, a base plate, and at least two support walls, said at least two support walls, said at least two side walls and said base plate constituting a sectional area with at least three hollow sections, said base plate and said support walls constituting an internal section of said metal profile, with substantially triangular sectional area wherein a glass panel is attached to said metal profile supported by a flange of said metal profile.

2. The body section according to claim 1, wherein said metal profile includes a flange which is adapted to support a roof bow.

3. The body section according to claim 1, wherein said metal profile includes a flange.

4. The body section according to claim 1, wherein said metal profile includes a flange which is adapted to support a pillar.

* * * * *